US007113897B2

(12) United States Patent
Shimizu et al.

(10) Patent No.: US 7,113,897 B2
(45) Date of Patent: Sep. 26, 2006

(54) APPARATUS AND METHOD FOR TEXT SEGMENTATION BASED ON COHERENT UNITS (75) Inventors: Hiroyuki Shimizu, Musashino (JP); Shinya Nakagawa, Mitaka (JP)

(73) Assignee: Hewlett-Packard Company, Fort Collins, CO (US)

(*) Notice: Subject to any disclaimer, the term of this patent is extended or adjusted under 35 U.S.C. 154(b) by 434 days.

(21) Appl. No.: 10/182,779

(22) PCT Filed: Oct. 2, 2001

(86) PCT No.: PCT/US01/30734

§ 371 (c)(1),
(2), (4) Date: Oct. 9, 2002

(87) PCT Pub. No.: WO02/29547

PCT Pub. Date: Apr. 11, 2002

(65) Prior Publication Data

US 2003/0081811 A1    May 1, 2003

(30) Foreign Application Priority Data

Oct. 2, 2000    (JP) ............................. 2000-302321

(51) Int. Cl.
G60F 17/50    (2006.01)
G06F 17/30    (2006.01)

(52) U.S. Cl. ................. 703/2; 704/9; 706/45; 707/102; 707/104.1

(58) Field of Classification Search .................... 703/2; 704/1–10; 706/46, 45; 707/104.1, 102; 382/100, 280

See application file for complete search history.

(56) References Cited

U.S. PATENT DOCUMENTS 5,577,249 A * 11/1996 Califano ..................... 707/100

(Continued)

FOREIGN PATENT DOCUMENTS

JP    11-235574    8/1999

(Continued)

OTHER PUBLICATIONS

Yoshio Nakao, "Thematic Hierarchy detection of a text using lexical cohesion": pp. 83-112, (Abstract).

(Continued)

Primary Examiner—Thai Phan (57) ABSTRACT

The invention provides a text segmentation apparatus comprising means for analyzing an electronic text to determine likelihood of segmentation point for each of sentence ends in the text based on a coherent unit and means for segmenting the text into text segments based on the likelihood of segmentation point. The apparatus is programmed to segment the text segment at the position having the best likelihood of segmentation point within the text segment when the size of any of the segmented text segments exceeds a threshold value to be determined based on the specified text segmentation size. Particularly, the apparatus determines the similarity between the text parts contained in a pair of windows to be set up on the left and right sides of each sentence end position in the text so as to obtain similarity curves. Then, the apparatus determines the likelihood of segmentation point for each sentence end point based on the obtained similarity curves. The apparatus segments the text at the point having the best likelihood of segmentation point and further segments it at the point of the second best likelihood of segmentation point, and so on, until the size of all of the text segments becomes approximately equal to the specified segment size.

14 Claims, 7 Drawing Sheets

U.S. PATENT DOCUMENTS

| | | | |
|---|---|---|---|
| 5,761,191 A * | 6/1998 | VanDervort et al. | 370/232 |
| 6,185,524 B1 * | 2/2001 | Carus et al. | 704/9 |
| 6,317,708 B1 * | 11/2001 | Witbrock et al. | 704/9 |
| 6,411,962 B1 * | 6/2002 | Kupiec | 707/102 |
| 6,611,825 B1 * | 8/2003 | Billheimer et al. | 706/45 |
| 6,675,174 B1 * | 1/2004 | Bolle et al. | 707/104.1 |
| 2004/0078188 A1 * | 4/2004 | Gibbon et al. | 704/1 |

FOREIGN PATENT DOCUMENTS

| | | |
|---|---|---|
| JP | 11-242684 | 9/1999 |
| JP | 2000-235574 | 8/2000 |

OTHER PUBLICATIONS

Mochizuki et al., "Passage-Level Document Retrieval Using Lexical Chains": pp. 101-126, (Abs).

Tamura et al., "Text Structuring by Composition and Decomposition of Segments": pp. 59-78.

Mochidzuki et al., "Text Segmentation Used Combining Multiple Knowledge Sources", (Abstract).

Nishizawa et al., "Bottom-Up Discourse Segmentation Based on Word Frequency": pp. 145-152.

Hirao et al., "Text Segmentation Based on Word Importance and Lexical Cohesion": pp. 41-48.

Jeffrey C. Reynar, "An Automatic Method of Finding Topic Boundaries".

Litman et al., "Combining Multiple Knowledge Sources for Discourse Segmentation".

Hearst et al., "Subtopic Structuring for Full-Lenght Document Access".

Marti A. Hearst, "Multi-Paragraph Segmentation of Expository Text".

Marti A. Hearst, "Texttiling:Segmenting Text Into Multi-Paragraph Subtopic Passages": pp. 34-64.

Marti A. Hearst, "Texttiling: A Quantitative Approach to Discourse Segmentation": pp. 1-10.

Salton et al., "Automatic Text Decomposition Using Text Segments and Text Themes".

Mitra et al., "Automatic Text Summarization by Paragraph Extraction": pp. 1-11.

* cited by examiner

Likelihood curve of segmentation point

APPARATUS AND METHOD FOR TEXT SEGMENTATION BASED ON COHERENT UNITS

This application claims priority from PCT Patent Application No. PCT/US01/30734, filed Oct. 2, 2001 and Japanese Patent Application No. 2000-302321, filed Oct. 02, 2000.

FIELD OF THE INVENTION

The invention relates to a text segmentation technique and, more specifically, to a text segmentation technique for segmenting texts based on coherent units.

BACKGROUND OF THE INVENTION

After a text has been retrieved through a text search process, a user must make a further search for retrieving the required text part from the displayed text if the searched text is still so bulky as to contain many topics. In such a case, if the user makes a search through the text segments that have been segmented beforehand based on topics, the user will be able to immediately display the desired text segment. And accordingly it may become unnecessary for the user to make a further search for the required part. Therefore, if the text is segmented based on topics, it will be easy to perform various text processing applications.

Several text segmentation methods are disclosed in, for example, Laid Open Japanese Patent Application No. H11-242684, Laid Open Japanese Patent Application No. 2000-235574 and Laid Open Japanese Patent Application No. H10-72724. Laid Open Japanese Patent Application No. H11-242684 proposes a text segmentation apparatus wherein texts are handled in terms of not only association between adjacent sentences but also global sentence association. Japan Patent Application No. 2000-235574 proposes a method for obtaining segmentation points based on a square matrix whose elements include relativeness between the paragraphs, the text being segmented in accordance with a paragraph format and the like. Laid Open Japanese Patent Application No. H10-72724 proposes a method comprising the steps of determining the relativeness at each position based on a plurality of windows, determining the border of the topics for each layer and integrating those borders to identify the topic border.

It is possible to segment a text in terms of topics using the above-referenced methods. However, those referenced methods do not take into consideration the size of the text. In particular, when using such equipments as mobile telephones and PDA devices that have some limitation on the resources, e.g., small size of the display, users may need an extra operation, for example, a scrolling, to display the segmented text segments. In addition, the size of the text segments may be beyond the limit of the storage of such equipment. Accordingly, the text segment that is segmented by one of the above-referenced conventional text segmentation methods cannot be necessarily a desirable segmentation unit to users and/or terminal devices.

Therefore, there is a need for a text segmentation method for segmenting a text in accordance with coherent units as well as a specified text segment size. Also, there is a need for a technique for providing a group of text segments which users can easily read through even if they are displayed on small size display screens of mobile telephones and/or PDA devices.

SUMMARY OF THE INVENTION

A text segmentation apparatus provided in accordance with one aspect of the invention comprises means for analyzing an electronic text to determine likelihood of segmentation point for each of sentence ends in said text based on a coherent unit and means for segmenting said text into text segments based on said likelihood of segmentation point and a specified text segmentation size.

A text segmentation apparatus provided in accordance with another aspect of the invention comprises means for analyzing an electronic text to determine likelihood of segmentation point for each of sentence ends in said text based on a coherent unit and means for segmenting said text into text segments based on said likelihood of segmentation point, wherein when the size of any of said segmented text segments exceeds a threshold value to be determined based on a specified text segmentation size, said text segmentation apparatus is programmed to segment said text segment at the position having best likelihood of segmentation point within said text segment.

In accordance with one embodiment of the invention, the text is segmented into a group of text segments, each having the approximately equal size to the specified one. In order to achieve this, the inventive apparatus first determines the similarity between the text parts contained in a pair of windows to be set up on the left and right sides of each sentence end position in the text so as to obtain similarity curves. Then, the apparatus determines the likelihood of segmentation point for each sentence end point based on the obtained similarity curves. The apparatus segments the text at the point having the best likelihood of segmentation point and further segments it at the point of the second best likelihood of segmentation point, and so on, until the size of all of the text segments becomes approximately equal to the specified segment size.

DETAILED DESCRIPTION OF THE PREFERRED EMBODIMENTS

Figure 1:
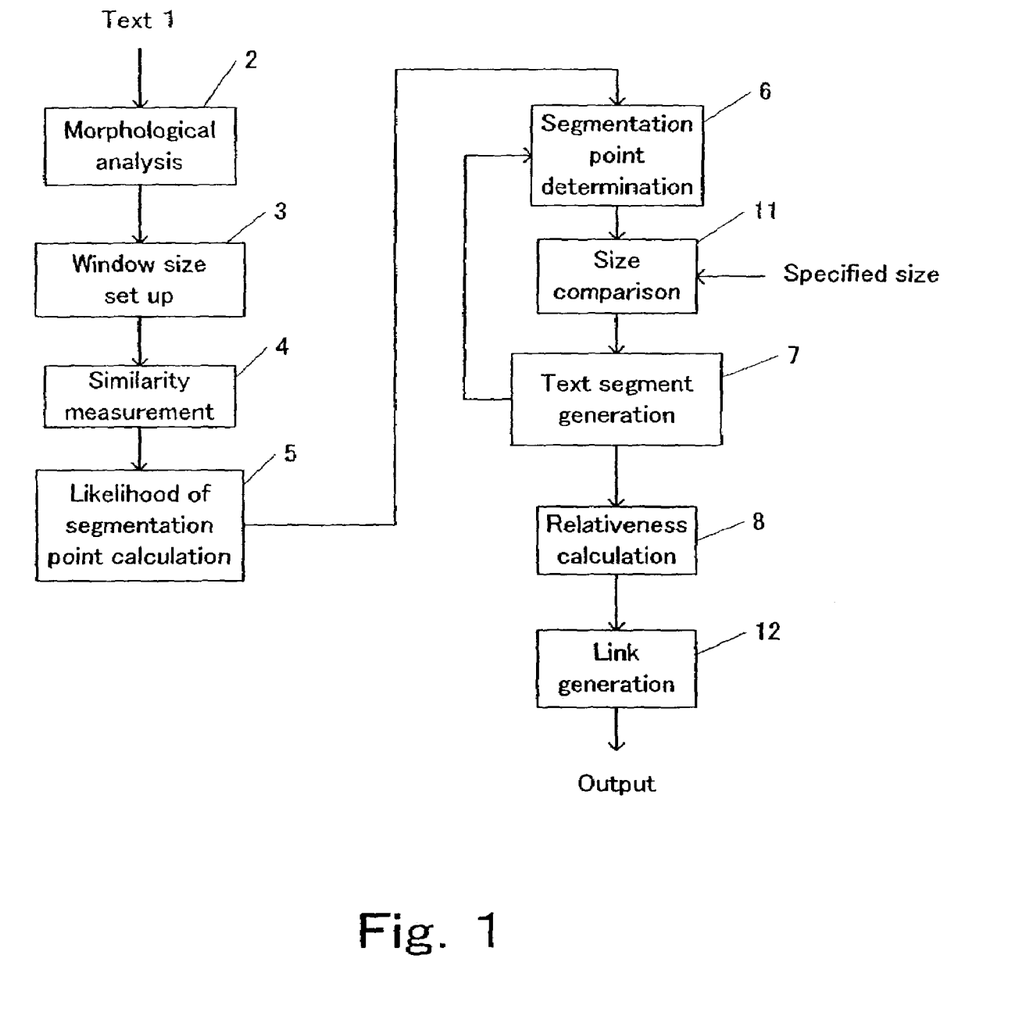
FIG. 1 is a block diagram illustrating a text segmentation apparatus in accordance with one embodiment of the invention.
Figure 10:
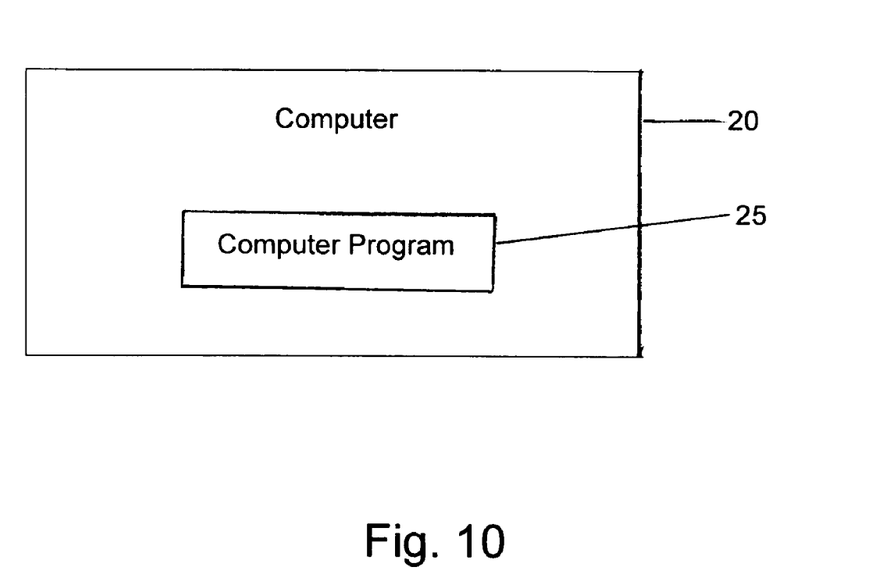
FIG. 10 is a block diagram of the computer of the text segmentation apparatus of the present invention.

One embodiment in accordance with the invention will be described in detail in the following with reference to the attached drawings. FIG. 1 illustrates the functional blocks showing the structure of the system in accordance with one embodiment of the invention. Referring to FIG. 10, the system of this embodiment comprises a computer 20, which may be a general purpose computer, work station or personal computer in terms of hardware structure. The invention can be implemented through the execution of the program instructions of a computer program 25 on the general purpose computer 20. Each of the blocks shown in FIG. 1 represents the respective function embodied by such program.

A morphological analysis block 2 receives an electronic text 1 as an object to be segmented, extract words from the text and append the information upon the part of speech to each of extracted words. A window size setup block 3 sets up a window size to be used for measuring the similarity between the adjacent sentences contained in the concerned text. The window size is defined as a predetermined length in the left and right directions from a sentence end position. A similarity measurement block 4 measures, at each sentence end position, the similarity between the text portions contained in the left and right windows that have been set up by the window size setup block 3 and generate the corresponding similarity curve.

A determination block 5 is for determining the likelihood of segmentation point at each sentence end position based on the similarity curve generated by the similarity measurement block 4. A segmentation point determination block 6 uses the likelihood of segmentation point determined in the determination block 5 to select as a segmentation point the position having the best likelihood of segmentation point within the largest text segment. At the starting point of the process when the text 1 is not segmented yet, the entire text 1 is to be regarded as the largest text segment.

A size comparison block 11 compares the size of the candidate text segment selected by the segmentation point determination block 6 with a threshold size value to be determined based on the text segment size specified by the output equipment. If the size of the candidate text segment is larger than the threshold size, the position having the best likelihood of segmentation point in that candidate text segment may be selected as a segmentation point. A text segment generation block 7 collects the candidate text segments obtained through the previous blocks to generate a set of text segments. Until the size of all of the text segments within the set becomes smaller than the specified size, the process may return to the segmentation point determination block 6 and the size comparison block 11 to repeat their processes.

A relativeness determination block 8 determines the similarity between adjacent segments generated by the text segment generation block 7 and performs an association process upon those text segments using that similarity. A link generation block 12 generates a link between the text segments having the high association in terms of contents based on the determination result by the relativeness determination block 8. Thus, such generated text segments may be transmitted to the requesting terminal equipment, e.g., a PDA or a mobile telephone.

In one embodiment, a text segmentation apparatus in accordance with the invention may be used under the Internet environment. For example, a user may use a PDA to access a web site via Internet, search for the data and display the acquired data on a PDA browser. In this case, the web site may utilize the inventive text segmentation apparatus to segment the text to be transmitted to the PDA into text segments so that the size of the text segments can match the display screen of the PDA. The text segments may be converted to the HTML format and accordingly appropriate hyperlinks for pointing to the associated text segments may be embedded before transmission to the PDA. Because the size of the text segments already matches the display screen of that PDA, the user can jump to the next text segment or to another text segment having a higher relativeness in terms of the content by clicking a button, so the user can comfortably view the text even on the small size display screen.

Figure 2:
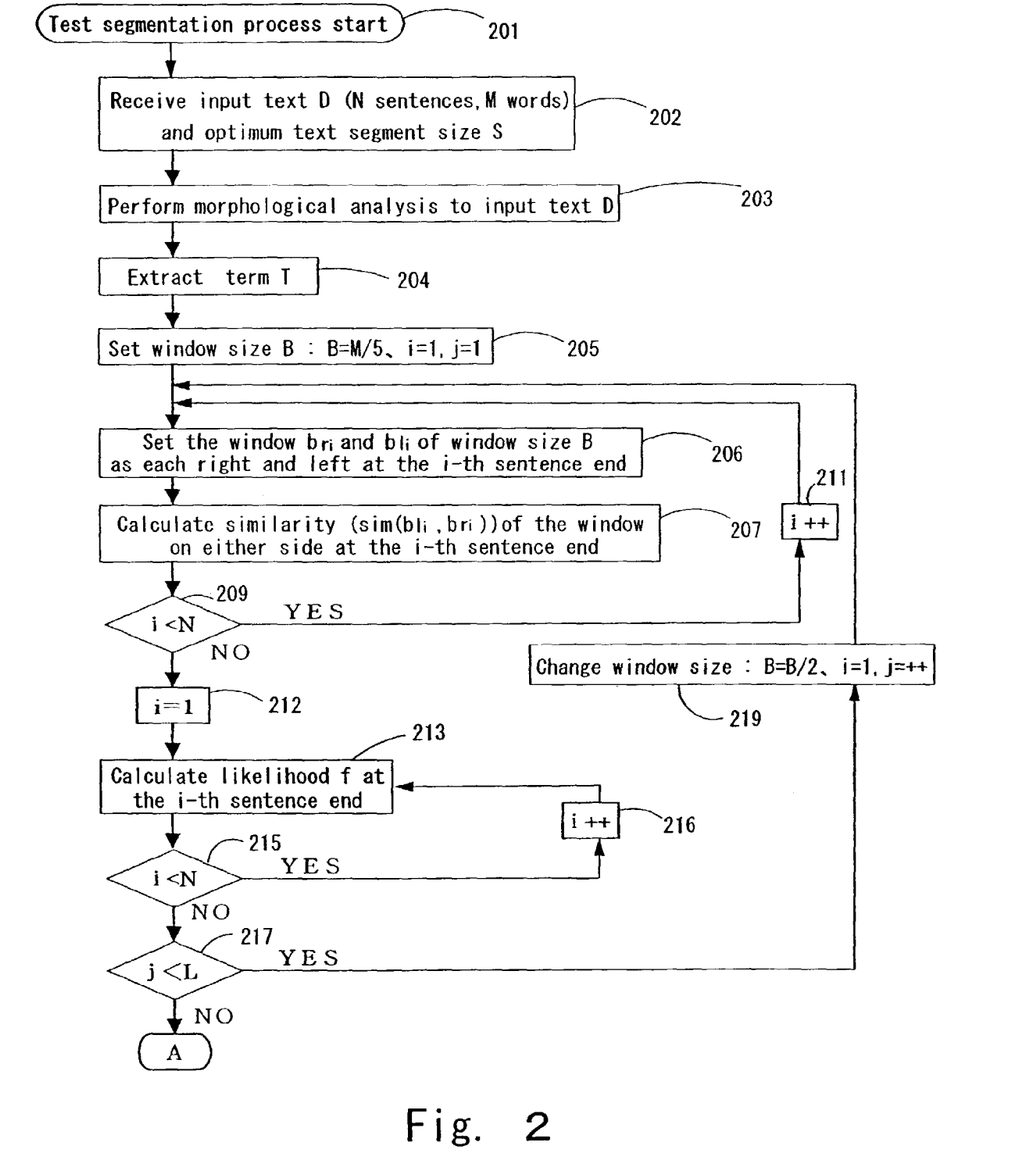
FIG. 2 is a schematic flow chart illustrating a first half of the text segmentation algorithm.
Figure 3:
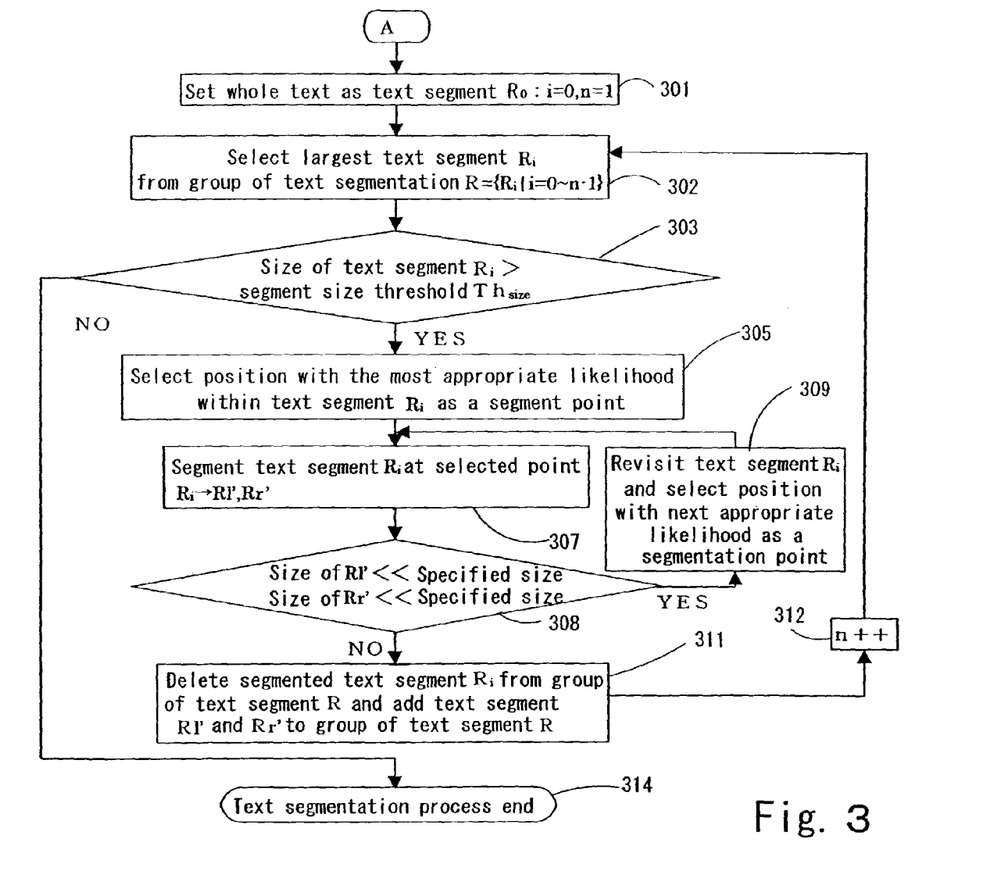
FIG. 3 is a schematic flow chart illustrating a second half of the text segmentation algorithm.
Figure 4:
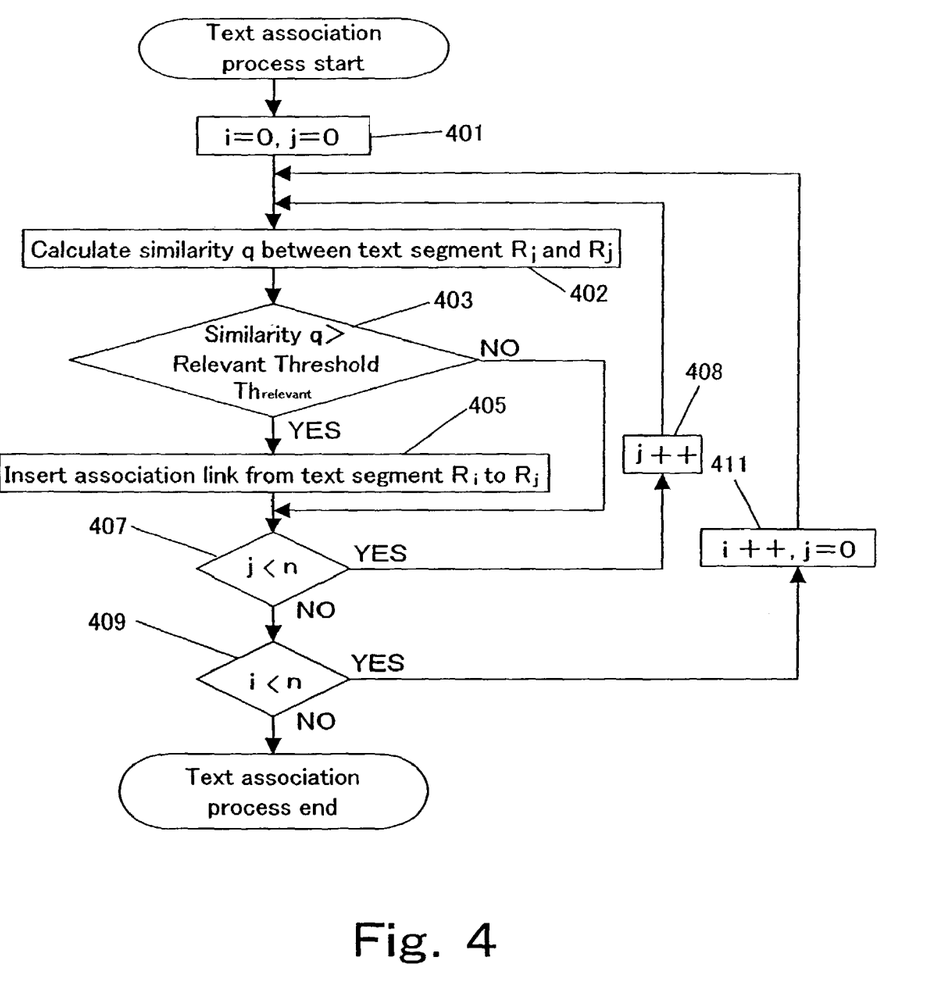
FIG. 4 is a schematic flow chart illustrating an algorithm for performing an association process between text segments.
Figure 5:
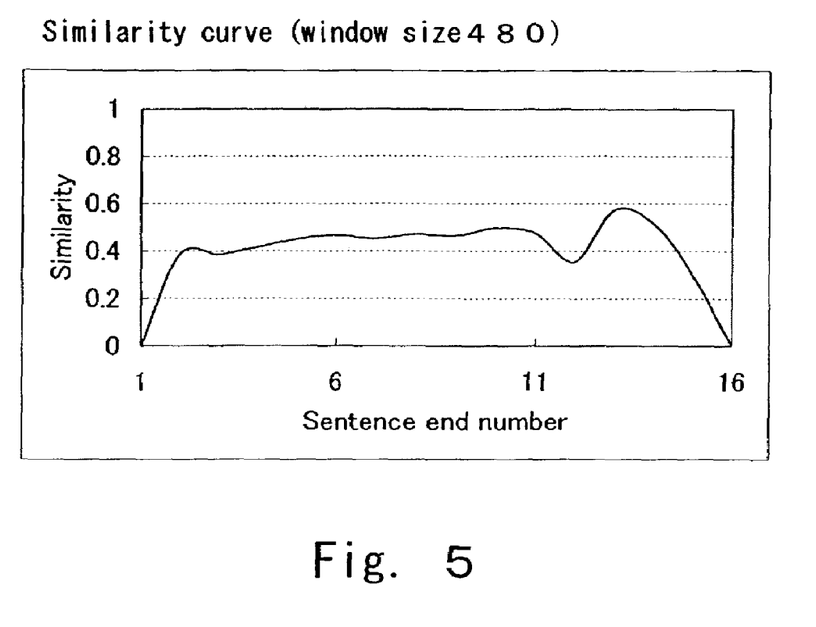
FIG. 5 is a graphic chart illustrating a similarity curve when the window size is set to 480 words.
Figure 6:
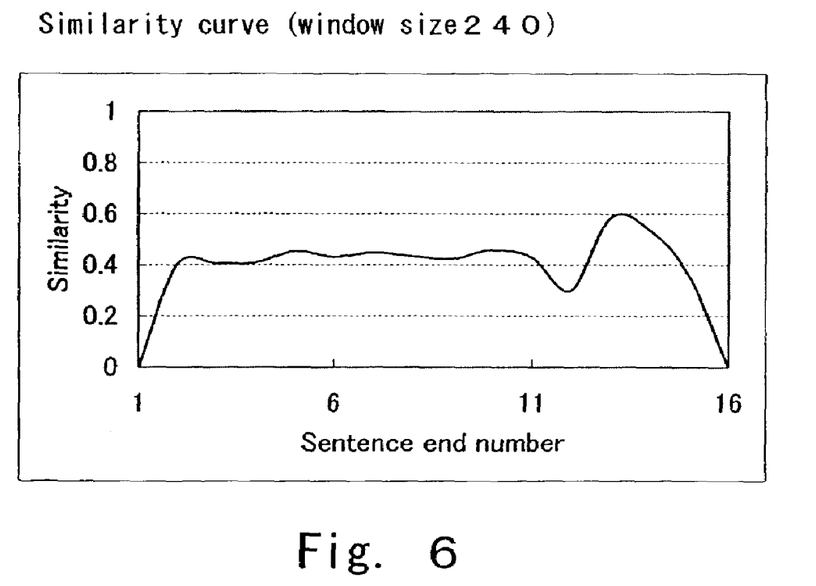
FIG. 6 is a graphic chart illustrating a similarity curve when the window size is set to 240 words.
Figure 7:
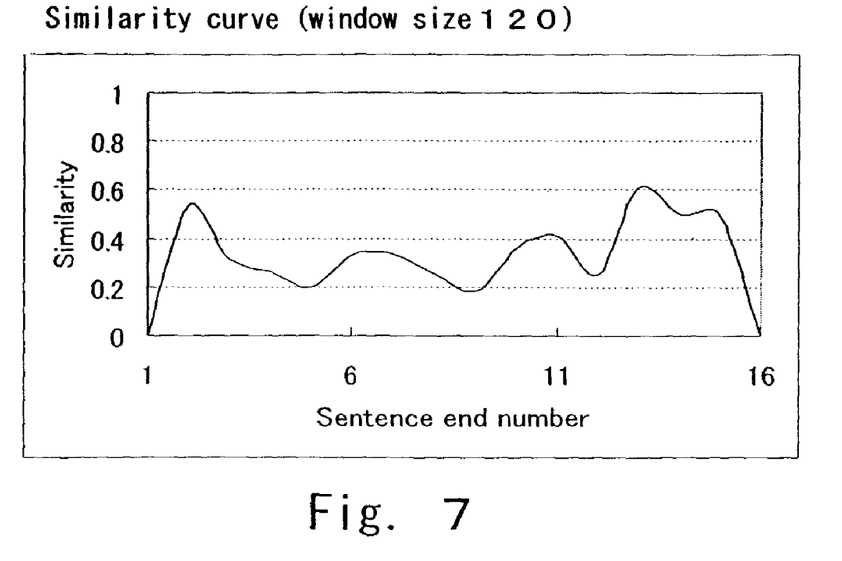
FIG. 7 is a graphic chart illustrating a similarity curve when the window size is set to 120 words.
Figure 8:
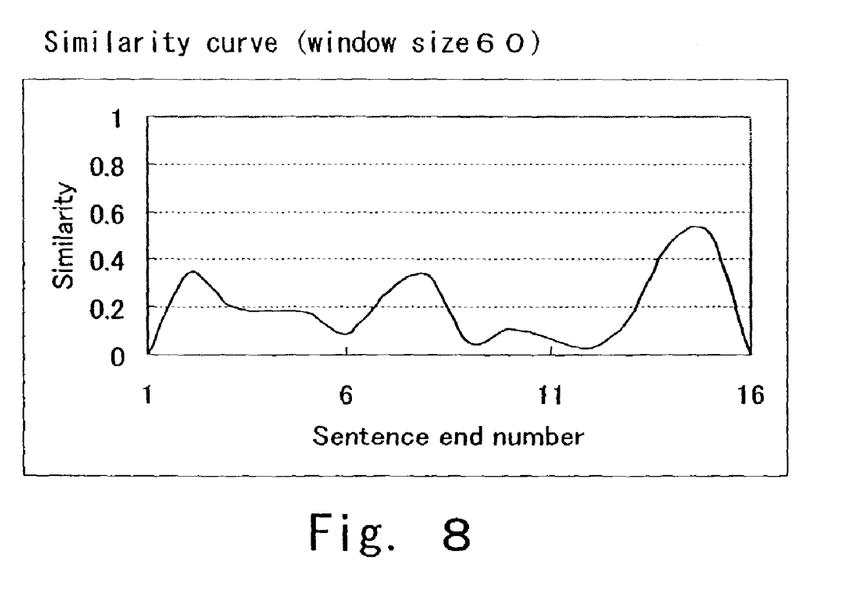
FIG. 8 is a graphic chart illustrating a similarity curve when the window size is set to 60 words.

FIG. 2 and FIG. 3 illustrate flowcharts of the text segmentation algorithm. FIG. 4 illustrates a flowchart of the association algorithm among the text segments. At first, with reference to FIG. 2, the process receives an electronic text D containing N sentences and M words as well as the optimum text segment size S(step 202). The optimum text segment size means that it should be defined based on the number of the characters specified by the user or the number of displayable characters on the PDA or the mobile telephone. For example, the optimum text segment size may be 100 characters when the terminal device can display 100 characters.

In the next step 203, the process performs a morphological analysis on the input electronic text D to extract the words and give the information on the part of speech to each of the words. In step 204, the process extracts from those words any noun that appears more than twice in the text D as a term $t_i$ and generates a term list $T(=t_1, t_2, t_3, \ldots, t_n)$.

The process continues to set up the window size B in step 205. The window size B may be initially set to, for example, a fifth (⅕) of the number M of the words contained in the concerned text. Then, in step 206, the process sets a pair of the windows each having the window size B on the left and right sides of the respective end positions of the sentences contained in the concerned text and obtains a vector $W=(w_{t1}, W_{t2}, W_{t3}, \ldots, W_{tn})$ using the above described terms as its elements from the text portions contained in the left and right windows, where $w_{t1}$ represents the occurrence frequency of the term $t_1$ in the text contained in the window. In step 207, the process determines the cosine measure $sim(b_l, b_r)$ as the similarity at that position from the two vectors above obtained. The cosine measure may be obtained by the following equation (1);

$$sim(b_l, b_r) = \frac{W_{bl} \cdot W_{br}}{\sqrt{W_{bl}^2 + W_{br}^2}} \quad (1)$$

where $b_l$ and $b_r$ represent the text portions contained in the left and right windows respectively, and $W_{b1}$ and $W_{br}$ means vectors representing the occurrence frequency of the terms appearing respectively in the left and right windows. As the number of the terms appearing in both left and right windows increases, the similarity gained in the equation (1) will be getting higher (up to 1 at maximum). If there is no common term, the similarity becomes zero. That is, the larger value of the similarity means a higher probability of common topics being included in the left and right windows whereas the less value means a high probability of the topic boundary.

The suffix i shown in FIG. 2 represents the number of the sentence contained in the text where the sequence of the numbers 1, 2, 3, . . . , N are given to the sentences starting from the top sentence of the concerned text. Accordingly, the similarity determination for the end position of each sentence is performed by incrementing i until it reaches N, that is, it is determined NO in step 209. Thus, the similarity curve for the concerned text may be obtained. FIG. 5 through FIG. 8 illustrate similarity curves for the following sample input text:

TABLE 1

The community of mostly volunteer programmers that has built Linux into a formidable operating system is getting some help from computer industry giants. International Business Machines Inc., Intel Corp., Hewlett-Packard Co. and NEC Corp. are announcing Wednesday that they will create a laboratory with an investment of several million dollars where
programmers can test Linux software on the large computer systems that are common in the corporate world. The lab is expected to open by the end of the year near Portland, Ore. Linux is an
"open source" operating system that anyone can modify,
as long as the modifications are made available for free on the Internet. It has a devoted following among programmers, who collaborate on software projects over the Web. These software
engineers can usually only test software on their own desktop computers, part of the reason Linux is now rarely used on larger computers. "The Open Source Development Lab will help fulfill a need that individual Linux and open source developers often have: access to high-end enterprise hardware," said Brian Behlendorf, creator of the open source Web server software Apache. Irving Wladawsky-Berger, the head of IBM's Linux group, said the lab would help companies run hardware from different vendors together, as well as let run "clusters" of computers working as one. The four main sponsors said they will contribute several millions of dollars to the project. The lab is also backed by smaller companies that specialize in Linux products, like Red Hat Inc., Turbolinux Inc., Linuxcare Inc. and VA Linux Systems Inc., as well as Dell Computer Corp. and Silicon Graphics Inc. The founding companies said the lab will be run by a nonprofit organization that will select the software projects that gain access to the lab in an "open, neutral process." Linux is seen as an alternative to proprietary operating systems like Microsoft's Windows and Apple OS. Its backers say the publicly available source code, or software blueprint, makes it more flexible and reliable. Analyst Bill Claybrook at Aberdeen Group said the project sponsors are backing Linux because it gives them a chance to influence an operating system for their computers. "These companies see that they can play a much more important role in developing Linux than they can in, let's say Windows, because Microsoft pretty much decides what to put in Windows," he said.

In FIG. 5 through FIG. 8, horizontal axes represent each sentence end position, the vertical axes represent the corresponding similarity, and window sizes represent the number of the words contained respectively in the left and right windows.

The process continues to obtain the likelihood of segmentation points f(c) for each end position of the sentences c based on those similarity curves. The likelihood of segmentation points f(c) may be determined from the following equations. In step 209, when i=N, in other words, once the process has gained the similarity curve under the condition of B=M/5 for all the sentences contained in the concerned text, the process sets i=1 (step 212) and determines the likelihood of segmentation point for the end position of the first sentence (step 213). This determination will be repeated by incrementing i (step 216) until it reaches N.

$$f(c) = \alpha \cdot fs(c) + \beta \cdot fg(c) \quad (2)$$

$$fs(c) = 1 - s(c) \quad (3)$$

$$fg(c) = \frac{(s(c-) - s(c)) + (s(c+) - s(c))}{2} \quad (4)$$

where s(c) represents the similarity at the end position c of each sentence, s(c−) represents the similarity at the end position of the sentence immediately before the end position c, s(c+) represents the similarity at the end position of the sentence immediately after the end position c, and alpha ($\alpha$) and beta ($\beta$) are parameters to be appropriately determined through the experiment.

The value of the likelihood of segmentation point of the equation (2) may become larger when the corresponding similarity is at minimal point or the magnitude of the transition between adjacent similarities is large, whereas it becomes smaller when the corresponding similarity is large or the magnitude of the transition between adjacent similarities is small.

When i reaches N (that is, it is determined NO in step 215), the process sets the window size B to a half (½) of the initial size and return to step 206 to repeat the subsequent steps. Then, after those steps complete, the process further sets the window size B to the half of the current one and repeats the subsequent steps. These processes are repeated until j reaches the total number L of the similarity curves, wherein it is determined NO in step 217.

Figure 9:
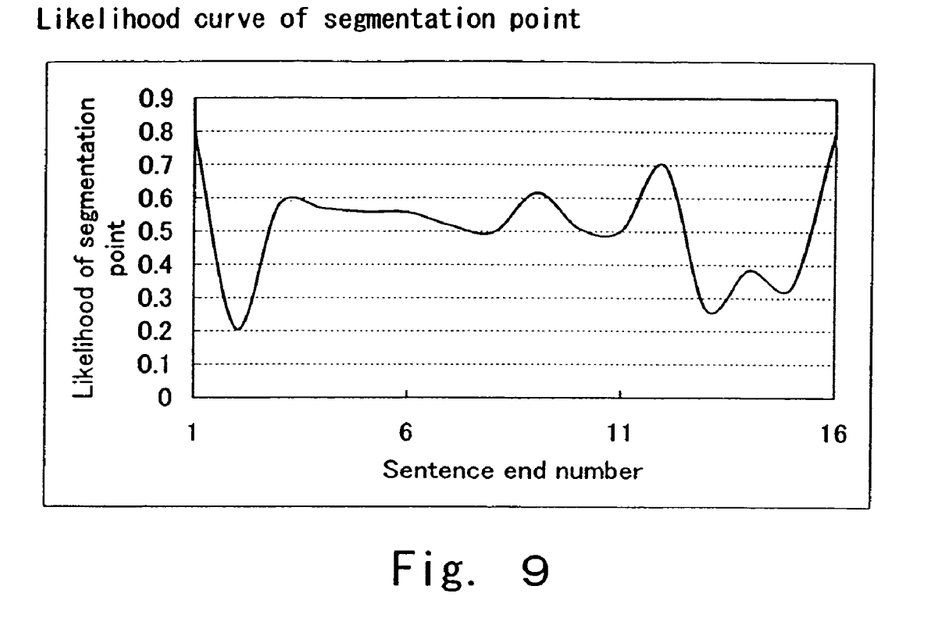
FIG. 9 is a graphic chart illustrating a curve for the likelihood of segmentation points.

Then, using L pieces of the likelihood of segmentation point f(c) gained for the respective window sizes, the overall likelihood of segmentation point F(c) for the input text D may be gained as follows:

$$F(c) = \sum^{L} \gamma_j \cdot \log f_j(c) \quad (5)$$

where $f_j(c)$ represents the likelihood of segmentation point gained from the jth similarity curve, $\gamma_j$ means a weighting factor for each similarity curve. As for the value for $\gamma_j$, for example, 1 is given to the likelihood of segmentation point for the largest window size, ½ for the second largest, ¼ for the third one, and so on. The text segmentation process in this embodiment in the following will be performed based on the likelihood curve of segmentation point gained by equation (5). FIG. 9 shows such a likelihood curve of segmentation point.

Now, with reference to FIG. 3, the process starts at step 301 where the entire text before segmentation is represented as a text segment $R_0$. In step 302, the process selects the segment $R_i$ having the largest size from the text segment set R. The text segment set R initially includes only the text segment $R_0$ comprising the entire text.

The process continues to step 303 to compare the size of the selected text segment $R_i$ with the segment size threshold $Th_{size}$, which is to be determined based on the specified size, that is, the optimum segment size S. For example, if the segment size threshold $Th_{size}$ is determined to be 1.1 times of the optimum segment size S, the text segment having the size within 110% of the optimum segment size may be accepted.

If the size of the text segment $R_i$ exceeds the threshold $Th_{size}$, the end position c of the sentence that has the best likelihood of segmentation point f within the segment $R_i$ may be selected as a segmentation point in step 305. In step 307, the process may segment the text segment $R_i$ to generate new segments Rl', Rr'. When either of the segmented text segments Rl', Rr' is too much smaller than the specified size S (step 308), the process may revisit the previous unsegmented text segment $R_i$ and select as a segmentation point the end position of the sentence that has the second best likelihood of segmentation point within the segment $R_i$ and segment it accordingly (step 309).

Once the segment Rl' or Rr', the size of which is not too much small relative to the specified size S, has been thus gained, the $R_i$ is removed from the text segment set R, and the segments Rl' and Rr' are added to the text segment set R (step 311).

Then, back to step 302, the process may repeat the steps following the step 305 for the text segments having the size exceeding the threshold $Th_{size}$ until the size of the largest text segment among all text segments becomes smaller than the threshold $Th_{size}$, wherein it is determined NO in step 303. By starting from the segment having the best likelihood of segmentation point to perform the text segmentation process in sequence, it becomes possible to generate text segments having the approximately equal size while maintaining the global topic boundary of the text.

Table 2 shows a group of the text segments when the input document D shown in Table 1 has been segmented with the optimum segment size specified as 400 characters. It is understood that the size of each segment is almost equal to 400 characters as specified. Table 3 also shows an example of the text segments described in the markup language format.

TABLE 2

Text segment 1:

The community of mostly volunteer programmers that has built Linux into a formidable operating system is getting some help from computer industry giants. International Business Machines Inc., Intel Corp., Hewlett-Packard Co. and NEC Corp. are announcing Wednesday that they will create a laboratory with an investment of several million dollars where programmers can test Linux software on the large computer systems that are common in the corporate world.
Text segment 2:

The lab is expected to open by the end of the year near Portland, Ore. Linux is an "open source" operating system that anyone can modify, as long as the modifications are made available for free on the Internet. It has a devoted following among programmers, who collaborate on software projects over the Web. These software engineers can usually only test software on their own desktop computers, part of the reason Linux is now rarely used on larger computers.
Text segment 3:

"The Open Source Development Lab will help fulfill a need that individual
Linux and open source developers often have: access to high-end enterprise hardware," said Brian Be, creator of the open source Web server software Apache. Irving Wladawsky-Berger, the head of IBM's Linux group, said the lab would help companies run hardware from different vendors together, as well as let run "clusters" of computers working as one.
Text segment 4:

The four main sponsors said they will contribute several millions of dollars
to the project. The lab is also backed by smaller companies that specialize in Linux products, like Red Hat Inc., Turbolinux Inc., Linuxcare Inc. and VA Linux Systems Inc., as well as Dell Computer Corp. and Silicon Graphics Inc. The founding companies said the lab will be run by a nonprofit organization that will select the software projects that gain access to the lab in an "open, neutral process."
Text segment 5:

Linux is seen as an alternative to proprietary operating systems like Microsoft's Windows and Apple OS. Its backers say the publicly available source code, or software blueprint, makes it more flexible and reliable. Analyst Bill Claybrook at Aberdeen Group said the project sponsors are backing Linux because it gives them a chance to influence an operating system for their computers. "These companies see that they can play a much more important role in developing Linux than they can in, let's say Windows, because Microsoft pretty much decides what to put in Windows," he said.

TABLE 3

```
<?xml version="1.0" encoding="Shift_JIS" ?>
    <text>
        <block id="0">
            <start_sentence href="input.xml#xpointer(@id=s0)"/>
            <end_sentence href="input.xml#xpointer(@id=s1)"/>
            <block_body>
                The community of mostly volunteer programmers that
                has built Linux into a formidable operating system is
                getting some help from computer industry giants.
                International Business Machines Inc., Intel Corp.,
                Hewlett-Packard Co. and NEC Corp. are announcing
                Wednesday that they will create a laboratory with an
                investment of several million dollars where
                programmers can test Linux software on the large
                computer systems that are common in the corporate
                world.
            </block_body>
        </block>
    </text>
```

With reference to FIG. 4, the association process for the text segments will be described. The process uses equation (1) to determine the similarity q between any pair of the text segments that have been gained through the above-described processes or between the important words and any one of such text segments (step 402). When the similarity q is larger than the relevant threshold $Th_{relevant}$ (step 403), the process may determine that similar topics are included between those text segments and embed an association link between those text segments (step 405). The relevant threshold $Th_{relevant}$ may be for example 0.5. In one embodiment of the invention, the relevant threshold $Th_{relevant}$ may be specified by the user preparing for such situations where the user may wish to display only segments of which relativeness is high or all of the segments as long as there is association among them.

Hyperlinks between the text segments having the similarity in terms of topics may be embedded into the corresponding text segments by means of the markup language. Obviously, the target of the hyperlink is not limited to one text segment but may be linked to plural text segments. By employing the Xpointer of XML as a markup language for example, links to a plurality of text segments could be constructed, enabling such a mechanism for displaying a plurality of associated segments from one text segment to be implemented on the browser.

It should be particularly noted that the invention as described above with reference to the specific embodiments is not intended only for the English text but it might be applicable to any other language text including Japanese in accordance with the equivalent processes on condition that the morphological analysis is performed upon that language.

In accordance with the invention, a text is segmented into smaller segments having the almost same size with the specified one, so the text can be efficiently displayed to the user even on a smaller size screen such as a mobile terminal's screen. In particular, the user will be able to determine at a glance if the text being displayed is required or not because the text segments can be generated so as to meet the screen size. In one embodiment, it is further possible for the user to scroll the text on a text segment basis when displaying the text because the text segments can be generated so as to meet the screen.

In accordance with one embodiment of the invention, the association between the text segments having the same topics is established, so it is possible for users to access another associated text segment easily. Besides, terminal display devices do not need a larger size of the storage because it can display the text on a segment basis instead of displaying the whole text. Furthermore, since the text can be transmitted segment by segment to the terminal display, limitations on the transmission packet size and/or the hardware could be taken into consideration at the transmission time. Also, the user could immediately read required portion of the text by presenting the search result as text segments to the user.

Furthermore, because coherent units are represented by text segments that are automatically extracted in accordance with the invention, the user may extract important words or sentences for each segment in accordance with known methods as disclosed in some known literatures (for example, a literature by M. Kameda entitled "Retrieval of important sentences based on the paragraph shifting method using relativeness between the paragraph and the sentence", Natural Language Process Study Group Report, Information Process Society, 1997, 119–126. 121–17), or generate a text summary for each segment in accordance with known methods as disclosed in some known literatures (for example, a literature by Y. Nakao entitled "Summary generation based on automatic recognition about the coherent, hierarchical structure of the text", Language Process Society, the 4th annual papers on "the today and future about the text summary", 1998, 72–79). The results can be presented on the display screen for users to easily and quickly read out and understand the summary of the text.

Although the invention has been described with reference to the specific embodiments, the invention is not intended to be limited to those embodiments.

What is claimed is:

1. A text segmentation apparatus comprising:
a computer that includes a program comprising program instructions that cause said computer to execute the steps of:
    (a) calculating a similarity $S_{c,1}$ at an end of a $c^{th}$ sentence based on a vector created by words that appear in a specified window of a text determined by a number of words, from the end of the $c^{th}$ sentence backward, and based on a vector created by words that appear in the specified window determined by a number of words, from the end of the $c^{th}$ sentence forward, where c=1, 2, 3 . . . N;
    (b) calculating a likelihood $f_{c,1}$ at the end of the $c^{th}$ sentence based on a similarity $S_{c-1,1}$, a similarity $S_{c,1}$, and a similarity $S_{c+1,1}$, which corresponds to the end of a $(c-1)^{th}$ sentence, the $c^{th}$ sentence and a $(c-1)^{th}$ sentence;
    (c) calculating a likelihood $f_{c,k}$ at the end of the $c^{th}$ sentence based on $S_{c-1,k}$, $S_{c,k}$, and $S_{c+1,k}$ which are calculated by changing said specified window, where k=1,2,3, . . . L;
    (d) calculating an overall likelihood $F_c$ at the end of the $c^{th}$ sentence based on said $f_{c,k}$; and
    (e) segmenting said text, based on said overall likelihood $F_c$ into text segments.

2. The text segmentation apparatus as claimed in claim 1, wherein when the size of any of said segmented text segments is smaller to a predetermined degree than the specified text segmentation size, said program instructions further cause said computer to revisit the previous unsegmented text segment so as to segment said text at the position having second best likelihood of segmentation point.

3. The text segmentation apparatus as claimed in claim 1, wherein said program instructions further cause said computer to determine the similarity between the segmented text segments and form association links on the text segments if their determined similarity exceeds a predetermined threshold value.

4. The text segmentation apparatus as claimed in claim 3, wherein said text segments are formatted using a markup language, and said association links are embedded in said text segments using said markup language.

5. A display device receiving the segmented text segments from the text segmentation apparatus as claimed in claim 1 for displaying said text segments in sequence in terms of their association.

6. The display device as claimed in claim 5, wherein said segmented text segments are associated with each other based on the similarity between the text segments or the global text structure and then they are displayed in sequence of such association.

7. The text segmentation apparatus as claimed in claim 1, wherein said specified size is determined in accordance with one or more characteristics of a display device for a display of said text segments.

8. A text segmentation apparatus comprising:
a computer that includes a program comprising program instructions that cause said computer to execute the steps of:
    (a) calculating a similarity $S_{c,1}$ at an end of a $c^{th}$ sentence based on a frequency of each word that appears in a specified window of a text determined by a number of words, from the end of the $c^{th}$ sentence backward, and on a frequency of each word that appears in the specified window determined by a number of words, from the end of the $c^{th}$ sentence forward, where c=1, 2, 3 . . . N;
    (b) calculating a likelihood $f_{c,1}$ at the end of the $c^{th}$ sentence based on a similarity $S_{c-1,1}$, a similarity $S_{c,1}$, and a similarity $S_{c+1,1}$, which corresponds to the end of a $(c-1)^{th}$ sentence, the $c^{th}$ sentence and a $(c-1)^{th}$ sentence;
    (c) calculating a likelihood $f_{c,k}$ at the end of the $c^{th}$ sentence based on $S_{c-1,k}$, $S_{c,k}$, and $S_{c+1,k}$ which are calculated by changing said specified window, where k=1,2,3, . . . L;
    (d) calculating an overall likelihood $F_c$ at the end of the $c^{th}$ sentence based on said $f_{c,k}$; and
    (e) segmenting said text, based on said overall likelihood $F_c$ into text segments.

9. The text segmentation apparatus as claimed in claim 8, wherein for segments of said text that have more words than said specified number, said program instructions further cause said computer to execute the following steps of:
    (f) calculating a similarity $T_{d,1}$ at an end of a $d^{th}$ sentence based on a frequency of each word that appears in a specified window of a text determined by a number of words, from the end of the d sentence backward, and on a frequency of each word that appears in the specified window determined by a number of words, from the end of the $d^{th}$ sentence forward, where d=1, 2, 3 . . . M;
    (g) calculating a likelihood $g_{d,1}$, at the end of the $d^{th}$ sentence based on a similarity $T_{d-1,1}$, a similarity $T_{d,1}$, and a similarity $T_{d+1,1}$, which corresponds to the end of a $(d-1)^{th}$ sentence, the $d^{th}$ sentence and a $(d-1)^{th}$ sentence;
    (h) calculating a likelihood $g_{d,p}$ at the end of the $d^{th}$ sentence based on $T_{d-1,p}$, $T_{d,p}$, and $T_{d+1,p}$ which are calculated by changing said specified window, where p=1,2,3, . . . Q;

(i) calculating an overall likelihood $G_d$ at the end of the $d^{th}$ sentence based on said $f_{d,p}$; and (j) segmenting said text, based on said overall likelihood $G_d$ into text segments whose words are within a specified range of words.

10. The text segmentation apparatus as claimed in claim 9, further comprising a display, and wherein said program instructions further cause said computer to execute the following steps of:

(k) calculating a similarity $S_{i,j}$ between an $i^{th}$ segment of the text and a $j^{th}$ segment of the text, with a frequency of each word that appears in the $i^{th}$ text segment, and a frequency of each word that appears in the $j^{th}$ text segment;

(l) relating the $i^{th}$ text segment to the $j^{th}$ text segment when the similarity $S_{i,j}$ is larger than the specified number; and (m) displaying on said display the $i^{th}$ text segment, and at the same time, displaying on said display the $j^{th}$ text segment.

11. The text segmentation apparatus as claimed in claim 9, further comprising a display, and wherein said program instructions further cause said computer to execute the following steps of:

(n) calculating a similarity $U_{x,y}$ between an $x^{th}$ sentence of the text and a $y^{th}$ sentence of the text, with a frequency of each word that appears in the $x^{th}$ sentence, and a frequency of each word that appears in the $y^{th}$ sentence;

(o) relating the $x^{th}$ sentence to the $y^{th}$ sentence when the similarity $U_{x,y}$ is larger than the specified number; and (p) displaying on said display the $x^{th}$ sentence, and at the same time, displaying on said display the $y^{th}$ sentence.

12. A program for a computer comprising a program stored thereon and comprising instructions that cause said computer to execute the steps of:

(a) calculating a similarity $S_{c,1}$ at an end of a $c^{th}$ sentence based on a frequency of each word that appears in a specified window of a text determined by a number of words, from the end of the $c^{th}$ sentence backward, and on a frequency of each word that appears in the specified window determined by a number of words, from the end of the $c^{th}$ sentence forward, where c=1, 2, 3 . . . N;

(b) calculating a likelihood $f_{c,1}$ at the end of the $c^{th}$ sentence based on a similarity $S_{c-1,1}$, a similarity $S_{c,1}$, and a similarity $S_{c+1,1}$, which corresponds to the end of a $(c-1)^{th}$ sentence, the $c^{th}$ sentence and a $(c-1)^{th}$ sentence;

(c) calculating a likelihood $f_{c,k}$ at the end of the $c^{th}$ sentence based on $S_{c-1,k}$, $S_{c,k}$, and $S_{c+1,k}$ which are calculated by changing said specified window, where k=1,2,3, . . . L;

(d) calculating an overall likelihood $F_c$ at the end of the $c^{th}$ sentence based on said $f_{c,k}$; and (e) segmenting said text, based on said overall likelihood $F_c$ into text segments.

13. The program as claimed in claim 12, wherein said program instructions cause said computer to execute the further steps of:

(f) calculating a similarity $T_{d,1}$ at an end of a $d^{th}$ sentence based on a frequency of each word that appears in a specified window of a text determined by a number of words, from the end of the $d^{th}$ sentence backward, and on a frequency of each word that appears in the specified window determined by a number of words, from the end of the $d^{th}$ sentence forward, where d=1, 2, 3 . . . M;

(g) calculating a likelihood $g_{d,1}$ at the end of the $d^{th}$ sentence based on a similarity $T_{d-1,1}$, a similarity $T_{d,1}$, and a similarity $T_{d+1,1}$, which corresponds to the end of a $(d-1)^{th}$ sentence, the $d^{th}$ sentence and a $(d-1)^{th}$ sentence;

(h) calculating a likelihood $g_{d,p}$ at the end of the $d^{th}$ sentence based on $T_{d-1,p}$, $T_{d,p}$, and $T_{d+1,p}$ which are calculated by changing said specified window, where p=1,2,3, . . . Q;

(i) calculating an overall likelihood $G_d$ at the end of the $d^{th}$ sentence based on said $f_{d,p}$; and (j) segmenting said text, based on said overall likelihood $G_d$ into text segments whose words are within a specified range of words.

14. A text segmentation method that uses a program running on a computer, said method comprising the steps of:

(a) calculating a similarity $S_{c,1}$ at an end of a $c^{th}$ sentence based on a frequency of each word that appears in a specified window of a text determined by a number of words, from the end of the $c^{th}$ sentence backward, and on a frequency of each word that appears in the specified window determined by a number of words, from the end of the $c^{th}$ sentence forward, where c=1, 2, 3 . . . N;

(b) calculating a likelihood $f_{c,1}$ at the end of the $c^{th}$ sentence based on a similarity $S_{c-1,1}$, a similarity $S_{c,1}$, and a similarity $S_{c+1,1}$, which corresponds to the end of a $(c-1)^{th}$ sentence, the $c^{th}$ sentence and a $(c-1)^{th}$ sentence;

(c) calculating a likelihood $f_{c,k}$ at the end of the $c^{th}$ sentence based on $S_{c-1,k}$, $S_{c,k}$, and $S_{c+1,k}$ which are calculated by changing said specified window, where k=1,2,3, . . . L;

(d) calculating an overall likelihood $F_c$ at the end of the $c^{th}$ sentence based on said $f_{ck}$; and (e) segmenting said text, based on said overall likelihood $F_c$ into text segments.

* * * * *